July 5, 1955   R. H. WISE   2,712,146
WINDSHIELD WIPER
Filed June 20, 1951
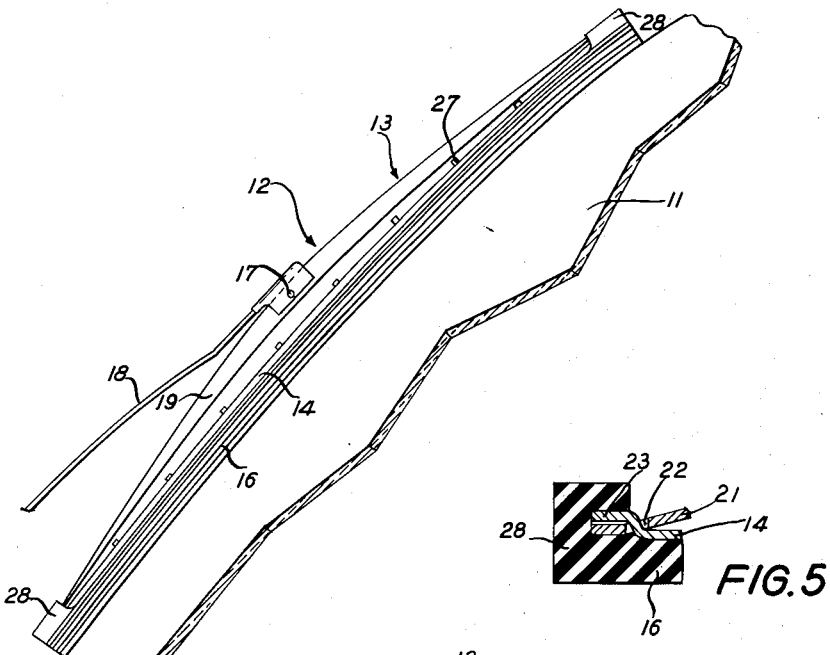
FIG. 1
FIG. 5
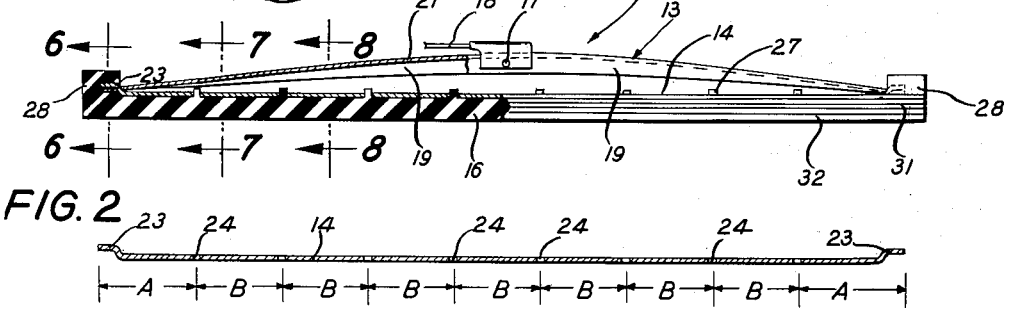
FIG. 2
FIG. 3
FIG. 4
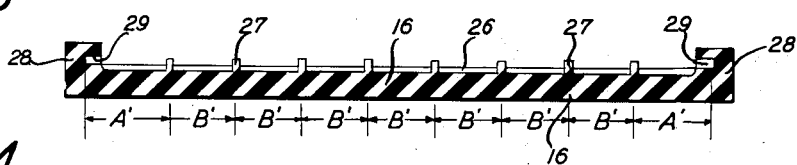
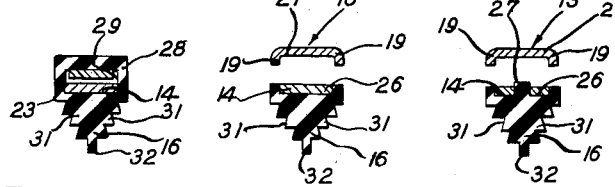
FIG. 6   FIG. 7   FIG. 8
RALPH H. WISE
INVENTOR.
BY
ATTORNEYS

United States Patent Office 2,712,146
Patented July 5, 1955

2,712,146

WINDSHIELD WIPER

Ralph H. Wise, Wayne, Mich., assignor to Ford Motor Company, Dearborn, Mich., a corporation of Delaware Application June 20, 1951, Serial No. 232,584

13 Claims. (Cl. 15—245)

This invention relates generally to windshield wipers for motor vehicles, and more specifically to a windshield wiper blade assembly particularly suitable for use in connection with curved windshields and the like.

It is an object of the present invention to provide a windshield wiper adapted to clean curved windshields of motor vehicles and to closely conform to the varying curvature of the windshield as the wiper is moved angularly over the surface of the windshield. A further object is to provide such a wiper which is simplified in construction and which is more economical to manufacture than many present types of windshield wipers for curved windshields. The present construction also provides a windshield wiper blade assembly considerably smaller in its cross sectional dimensions and consequently forming less of an obstruction to the vision of the driver.

A still further object of the invention is to provide a windshield wiper blade assembly comprising a relatively rigid blade holder adapted to be secured to the windshield wiper arm and to support a sub-assembly formed of a relatively flexible backing strip and a blade of elastic material. The invention contemplates an arrangement whereby it is unnecessary to replace the entire blade assembly when the blade is no longer effective, and in which the replacement cost is minimized by permitting the original rigid blade holder to be reused and only the flexible backing strip and the rubber blade replaced.

Windshield wiper blade assemblies in present use in connection with curved windshields are of several types but all involve a rather complicated supporting structure for supporting the flexible blade at various points along its length while at the same time permitting the blade to bend to conform to the curvature of the glass. It is an object of applicant's invention to provide a windshield wiper blade assembly in which the resilient blade and its backing strip are supported upon the relatively rigid blade holder only at their ends. This is accomplished by assembling the elastic blade to the backing strip under tension. In other words, the elastic blade in its free position is shorter than the length of the metal backing strip to which it is to be attached so that it must be sretched lengthwise when assembled thereto. This imparts to the assembly characteristics permitting it to have sufficient lateral stability to properly wipe the glass surface and also enabling it to closely conform to the curvature of the glass and to provide an efficient wiping action.

Other objects and advantages of this invention will be made more apparent as this description proceeds, particularly when considered in connection with the accompanying drawings, wherein:

Figure 1 is a side elevational view of the windshield wiper of the present invention shown in position adjacent a curved windshield.

Figure 2 is a side elevational view, partly in section, of the windshield wiper shown in Figure 1 with the assembly in the position it assumes when not applied to a curved windshield.

Figure 3 is a longitudinal cross sectional view through the backing strip of the assembly.

Figure 4 is a longitudinal cross sectional view through the elastic blade of the assembly with the latter being shown in its free position before assembly to the backing strip.

Figure 5 is an enlarged cross sectional view of the end portion of Figure 2.

Figures 6, 7 and 8 are enlarged cross sectional views taken on the planes indicated by the lines 6—6, 7—7 and 8—8 respectively of Figure 2.

Referring now to the drawings, and particularly to Figure 1, the reference character 11 indicates a curved windshield of a motor vehicle and the reference character 12 indicates generally the windshield wiper blade assembly of the present invention.

The windshield wiper blade assembly 12 comprises a relatively rigid bowed blade holder 13, a relatively flexible flat backing strip 14 and a blade 16 of elastic material such as rubber.

The blade holder 13 is channel-shaped in cross section and is centrally apertured to receive a pivot pin 17 connecting the blade holder to a windshield wiper arm 18 adapted to be conventionally angularly moved by means of windshield wiper mechanism (not shown). As best seen in Figure 2, the opposite legs 19 of the channel-shaped blade holder 13 diminish in width from a maximum adjacent the center of the blade holder and eventually merge into the base 21 of the blade holder adjacent the ends thereof. Referring now to Figure 5 as well as Figure 2, it will be seen that the end portions of the base 21 of the blade holder 13 are formed with laterally extending slots 22 adapted to receive the offset end portions 23 of the flat backing strip 14.

The backing strip 14 may be formed of various metals but is shown in the drawings as being a flat metal strip which is relatively flexible. The offset end portions 23 of the strip 14 are readily attached to and detached from the blade holder 13 by flexing the strip and withdrawing the offset end portions 23 from the slots 22 in the blade holder. In addition, it will be noted that the backing strip 14 is provided with a series of holes 24 spaced throughout its length and located centrally of the width of the strip.

Referring now to Figure 4, this view shows in longitudinal cross section the wiper blade 16 which is preferably formed of molded rubber or other elastic material. It will be seen that the blade 16 in its free position is considerably shorter in length than the metal backing strip 14 of Figure 3. Referring now to Figures 7 and 8 as well as Figure 4, it will be seen that the blade 16 is generally wedge-shaped in cross section and is provided with an elongated slot or groove 26 extending along one face thereof. The groove 26 conforms in width and depth to the dimensions of the metal backing strip 14 to enable the latter to be received therein. The blade 16 is also provided with a series of longitudinally spaced cylindrical tabs 27 projecting outwardly from the bottom of the groove 26 and adapted to be received within the openings 24 of the backing strip. The end portions 28 of the blade 16 are enlarged and are formed with sockets 29 facing inwardly toward the center of the blade. The sockets 29, as will be seen later, receive an embrace the end portions of the blade holder and the backing strip.

As best seen in Figures 6 to 8 the windshield wiper blade 16 is formed with a series of steps 31 on each side thereof terminating in a single flange 32 and providing a series of wiping edges on each side of the blade, as in conventional practice.

With reference to Figure 3, it will be noted that the openings 24 in the strip 14 are spaced from each other a distance "B." It will be seen that upon reference to Figure 4 that the tabs 27 of the blade which are to be inserted in the openings 24 are spaced from each other a distance "B'," and that the distance "B'" is smaller than the distance "B." It is accordingly necessary, during assembly of the blade to the backing strip, to stretch the blade lengthwise in order to align the tabs 27 with the openings 24 to permit them to be interlocked and to enable the backing strip 14 to be seated within the groove 26 in the blade. It will further be noted that the distance from the last hole 24 in the backing strip to the end of the strip, marked "A" in Figure 3, is greater than the distance from the last tab 27 to the end of socket 29 of the blade, marked "A" in Figure 4. Consequently it is also necessary to longitudinally stretch the end portions of the blade to enable the enlarged ends 28 to be slipped over the adjacent connected ends of the blade holder 13 and the backing strip 14. When thus assembled it will be seen that the offset ends 23 of the backing strip and the adjacent terminal ends of the base 21 of the blade holder are received within the sockets 29 formed in the enlarged ends 28 of the blade. In the completed assembly the blade 16 is under longitudinal tension, the amount of tension being dependent upon the difference between the free lengths of the blade and the backing strip. This can be predetermined to provide the most efficient unit for the particular design.

While it is within the contemplation of the invention that the blade be held under tension and secured to the backing strip by suitable interlocking means such as those shown and described above, the blade 16 can also be suitably bonded to the backing strip to enhance the assembly. For example, the adjacent surfaces of the backing strip and the blade may be coated with a suitable adhesive, then interconnected by stretching the blade as previously described, and finally bonded by suitable heat and/or pressure. If desired, the mechanical interlocking means between the blade and the backing strip may be dispensed with, and the blade secured to the backing strip solely by bonding. In this instance the blade is stretched and held in a stretched elongated condition until the bonding is completed so that the rubber will be under tension.

In an optional arrangement the blade may be bonded to the backing strip throughout the major portion of its length but may be left free or unbonded for the distance A—A' at each end thereof. This arrangement permits the enlarged ends 28 of the blade to be readily stretched over the adjacent ends of the backing strip and blade holder. Furthermore, this facilitates the disassembly of the unit in the event blade replacement is necessary. To replace a worn blade it is then only necessary to slip the enlarged ends 28 of the blade off the adjacent ends of the blade holder and backing strip, and then to detach the offset ends 23 of the backing strip from the slotted ends of the blade holder. A new subassembly of blade and backing strip may be then attached to the same blade holder. This arrangement permits the blade holder to be reused and effects an important economy in the cost of blade replacement.

As best seen in Figures 5 and 6, a slight clearance is provided between the adjacent end portions of the blade holder 13 and the backing strip 14 to permit the required twisting of the blade relative to the blade holder to enable the wiping edges on opposite sides of the blade to contact the windshield surface at the proper angle in each direction of blade movement.

Being flexible, the backing strip 14 readily bends to enable the blade to conform to the varying curvature of the glass as the blade is angularly moved over the windshield surface. With the rubber blade under lengthwise tension, the sub-assembly of blade and flexible backing strip accurately and efficiently follows the curvature of the glass without the necessity of providing support for the blade intermediate its ends. Not only does the blade readily assume a greater curvature as the curvature of the glass increases, but the tension of the blade enables the blade to rapidly return to a condition of smaller curvature (greater glass radius) as the windshield wiper is moved to windshield zones of this shape. The application of pressure from the blade holder to intermediate points of the blade is accordingly unnecessary and greatly simplified construction results. In addition, the longitudinally stretched blade presents highly efficient wiping edges to the glass.

It will be understood that the invention is not to be limited to the exact construction shown and described, but that various changes and modifications may be made without departing from the spirit and scope of the invention, as defined in the appended claims.

What is claimed is:

1. A wiper for curved surfaces comprising a longitudinally flexible backing strip, and an elongated blade of elastic material having interlocking connections to said backing strip at a pair of longitudinally spaced points with said elastic blade between said spaced points being stretched longitudinally to a length greater than its free length.

2. A wiper for curved surfaces comprising a longitudinally flexible metal backing strip, and an elongated blade of elastic material bonded to said backing strip under tension lengthwise of said blade, said blade and backing strip having interlocking connections at a pair of longitudinally spaced points.

3. A wiper for curved surfaces comprising a longitudinally flexible backing member, and a blade of elastic material stretched to a length greater than its free length and secured at longitudinally spaced points to said backing member in its stretched condition to maintain said blade under longitudinal tension between said spaced points.

4. A wiper for curved surfaces comprising a blade of elastic material having a body portion and a wiping portion, and a flat backing strip secured to the body portion of said blade, said flat backing strip being positioned generally at right angles to the wiping portion of said blade to stabilize said blade laterally, and said blade being stretched lengthwise and secured to said backing strip at a pair of longitudinally spaced points under tension.

5. A wiper for curved surfaces comprising a flexible backing strip, and a blade of elastic material adjacent said backing strip, said backing strip and said blade having a series of longitudinally spaced interlocking means securing said blade to said backing strip, the interlocking means on said blade being spaced closer together in the free position of said blade than the interlocking means on said backing strip so that when said means are interlocked said elastic blade is stretched lengthwise and is held under tension.

6. A wiper for curved surfaces comprising a blade of elastic material having a body portion and a wiping portion, said body portion having an outer face on the opposite side of said blade from said wiping portion and said face being formed with a groove extending lengthwise of said blade, and a flat backing strip positioned in said groove to stabilize said blade laterally, said blade being stretched lengthwise and secured to said backing strip under tension.

7. A wiper for curved surfaces comprising a backing member having a series of longitudinally spaced apertures therein, and a blade of elastic material having a series of longitudinally spaced projections formed thereon for interlocking engagement with the apertures in said blocking member, the projections on said blade being spaced closer together than the apertures in said member so that said blade is stretched longitudinally when assembled to said member and said projections interlocked in said apertures.

8. A wiper for curved surfaces comprising a flexible metal backing member, and a blade of elastic material having a free length materially shorter than the length of said backing member, said blade having enlarged end portions formed with sockets facing each other, said sockets receiving the ends of said backing member in embracing relationship to maintain said blade under longitudinal tension.

9. A wiper for cleaning curved surfaces comprising a longitudinally bowed blade holder, an elongated longitudinally flexible supporting member having its opposite ends connected to the ends of said holder, and a wiper blade of stretchable material secured at a pair of longitudinally spaced points to said supporting member under longitudinal tension.

10. A wiper for cleaning curved surfaces comprising a longitudinally bowed blade holder, a flat metal supporting strip arranged generally parallel to the surface to be cleaned and having its ends connected to the ends of said holder, and a wiper blade of stretchable material having a body portion bonded to said flat metal supporting strip under longitudinal tension and a wiping portion projecting therefrom toward the surface to be cleaned, said wiper blade having enlarged end portions formed with sockets for receiving the connected ends of said holder and said wiper blade.

11. A wiper for cleaning curved surfaces comprising a relatively rigid blade holder, a relatively flexible blade supporting member having its ends connected to the ends of said holder, and an elastic blade extending from end to end of said member, said blade and said member having spaced interlocking means formed along their length with the means on the member being spaced farther apart than the means on said blade in the free position of the latter so that said blade is placed under tension when said interlocking means are aligned with each other and interlocked.

12. The structure defined by claim 11 which is further characterized in that said blade is bonded to said supporting member in addition to being supported thereon by said interlocking means.

13. A wiper for cleaning curved surfaces comprising a bowed blade holder, a flat metal supporting strip arranged parallel to the surface to be cleaned and having its ends connected to the ends of said holder, and a wiper blade of stretchable material having a body portion bonded to said flat metal supporting strip throughout the major extent of its length but free from bonded connection to said supporting strip for a short distance at each end of said blade, said blade also having a wiping portion projecting from the body portion thereof toward the surface to be cleaned and also having integral means formed at each end of the blade adapted to embrace the ends of said strip, said unbonded end portions of said blade being stretchable to permit the integral end means to be stretched over the ends of the supporting strip.

References Cited in the file of this patent

UNITED STATES PATENTS

| | | |
|---|---|---|
| 218,431 | Dunham | Aug. 12, 1879 |
| 1,251,250 | Libby | Dec. 25, 1917 |
| 1,994,939 | Boulton | Mar. 19, 1935 |
| 2,039,278 | Blanchard | May 5, 1936 |
| 2,105,021 | Walton | Jan. 11, 1938 |
| 2,167,207 | Horton | July 25, 1939 |
| 2,324,365 | Coutts | July 13, 1943 |
| 2,543,383 | Scinta et al. | Feb. 27, 1951 |
| 2,589,339 | Carson | Mar. 18, 1952 |

FOREIGN PATENTS

| | | |
|---|---|---|
| 820,156 | France | July 26, 1937 |